(12) United States Patent
Bartizal et al.

(10) Patent No.: US 7,995,452 B2
(45) Date of Patent: Aug. 9, 2011

(54) THIN OPTICAL DATA STORAGE MEDIA WITH HARD COAT

(75) Inventors: David A. Bartizal, Hudson, WI (US); James M. DePuydt, Woodbury, MN (US)

(73) Assignee: Imation Corp., Oakdale, MN (US)

( * ) Notice: Subject to any disclaimer, the term of this patent is extended or adjusted under 35 U.S.C. 154(b) by 352 days.

(21) Appl. No.: 12/291,434

(22) Filed: Nov. 10, 2008

(65) Prior Publication Data

US 2010/0118689 A1    May 13, 2010

(51) Int. Cl.
*G11B 7/24* (2006.01)
(52) U.S. Cl. ............... 369/283; 369/275.5; 720/619
(58) Field of Classification Search .............. 369/275.1, 369/275.3, 275.4, 284, 282, 288, 286, 280, 369/283, 275.5; 720/619; 428/64.4
See application file for complete search history.

(56) References Cited

U.S. PATENT DOCUMENTS

| | | | |
|---|---|---|---|
| 7,389,520 B2 | 6/2008 | Hayashi et al. | |
| 7,698,716 B2 * | 4/2010 | LeBlanc et al. | 720/619 |
| 2004/0170116 A1 | 9/2004 | Moloo et al. | |
| 2004/0228262 A1 | 11/2004 | Bigley | |
| 2005/0018583 A1 | 1/2005 | Worthington et al. | |
| 2005/0018589 A1 | 1/2005 | Mizushima et al. | |
| 2005/0169147 A1 | 8/2005 | Kobayashi et al. | |

FOREIGN PATENT DOCUMENTS

CN    2550876    5/2003

OTHER PUBLICATIONS

"Flex-Lite Flexible DVD Disc-ProAction Media" from website http://www.proactionmedia.com/flex-lite-disc.htm?linkId=leftNav, pp. 1-4, printed Feb. 20, 2009.

* cited by examiner

*Primary Examiner* — Ali Neyzari
(74) *Attorney, Agent, or Firm* — Shumaker & Sieffert, P.A.

(57) ABSTRACT

This disclosure describes thin optical media that may be compliant with conventional DVD drives. Unlike conventional DVDs, however, the described media does not include the non-information bearing "dummy" substrate. Instead, the described media may comprise a single substrate having a thickness of approximately 0.6 millimeters. Depending on the format, reflective layers, information layers, dyes, phase change materials, or other materials may be deposited over the replicated side of the substrates. Furthermore, in accordance with this disclosure, a hard coat layer is also formed over the replicated side of the media in order to provide mechanical integrity to the media. Printable layers, printed layers, lacquer, or other materials may also be added. The elimination of the non-information bearing "dummy" substrate can reduce raw materials, thereby reducing costs and providing a more environmentally friendly optical disk. The hard coat can provide the mechanical protection to the replicated side of the 0.6 millimeter substrate.

16 Claims, 9 Drawing Sheets

FIG. 9

THIN OPTICAL DATA STORAGE MEDIA WITH HARD COAT

TECHNICAL FIELD

This disclosure relates to optical data storage media and, more particularly, digital versatile disks (DVDs).

BACKGROUND

Optical data storage disks have gained widespread acceptance for the storage, distribution and retrieval of large volumes of information. Optical data storage disks include, for example, audio CD (compact disc), CD-R (CD-recordable), CD-RW (CD-rewritable) CD-ROM (CD-read only memory), DVD (digital versatile disk), DVD-R, DVD-RW, DVD-ROM, DVD-RAM (DVD-random access memory), HD-DVD (high definition-DVD), Blu-Ray, and various other types of writable or rewriteable media, such as magneto-optical (MO) disks, phase change optical disks, and others.

Optical data storage disks are typically produced by first making a data storage disk master that has a surface pattern that represents encoded data and/or precision tracking features on the master surface. The surface pattern on the master disk, for instance, may be a collection of precisely dimensioned grooves or other features that define master pits and master lands, e.g., typically arranged in either a spiral or concentric manner. The master is typically not suitable as a mass replication surface, as the master features are typically defined within an etched photoresist layer formed over a master substrate.

After creating a suitable master, that master can be used to make a stamper, which is less fragile than the master. The stamper is typically formed of electroplated metal or a hard plastic material, and has a surface pattern that is the inverse of the surface pattern encoded on the master. An injection mold can use the stamper to fabricate large quantities of thermoplastic replica disk substrates. Also, photo-polymerization replication processes, such as rolling bead processes, have been used to fabricate replica disk substrates using stampers. In any case, each replica disk substrate may contain the data and tracking precision that was originally encoded on the master surface and preserved in the stamper. The replica disk substrates can be coated with other materials, such as dyes, phase change materials, and/or reflectors to form the optical disks.

Some types of optical data storage disks contain multiple substrates that are bonded together. For example, DVD, DVD-ROM, DVD-R, DVD-RW, and HD-DVD media constructions conventionally include two substrates, both having a thickness of approximately 0.6 millimeters. Typically, one of the substrates bears the data and/or tracking information, while the other non-information bearing substrate provides the functions of backside protection, reference clamping area, a labeling area, and improved mechanical stability. In these types of bonded media constructions, the information-bearing surface of one of the substrates is sandwiched between two substrates. As such, the information bearing surface is interrogated by a drive system using a beam of laser light that is brought to focus through the information bearing substrate. This, in turn, places strict optical requirements for thickness, thickness uniformity, index of refraction, and birefringence for the information-bearing substrate.

The non-information bearing "dummy" substrate, in conventional DVD constructions, provides backside protection insofar as the information bearing surface is encased between the two bonded substrates. In addition, the non-information bearing substrate also functions to improve robustness of the medium by improving both the dynamic and static mechanical stability. A bonded non-information bearing substrate improves static mechanical stability by minimizing bending stress to the information-bearing surface. Likewise, a properly bonded non-information bearing substrate improves dynamic mechanical runout for the rotating media.

With DVD media constructions (such as DVD, DVD-ROM, DVD-R, DVD-RW, and HD-DVD), the data layer is located approximately 0.6 millimeters in from the surface of the disk closest to the laser. During reading and recording, the laser beam passes through the portion of the disk located between the laser and the data layer. This portion of the disk, the optically functional portion, must adhere to specified requirements in regard to optical thickness, optical thickness uniformity, allowable thickness range, allowable birefringence, and range of optical index of refraction for the material.

SUMMARY

In general, this disclosure describes thin optical media that may be compliant with conventional DVD drives. Unlike conventional DVDs, however, the described media does not include the non-information bearing "dummy" substrate. Instead, the described media may comprise a single substrate having a thickness of approximately 0.6 millimeters. The substrate may be replicated via injection molding or a rolling bead photo-polymerization process, in order to define surface features, such as pits, lands, grooves, or the like. Depending on the format, reflective layers, information layers, dyes, phase change materials, or other materials may be deposited over the replicated side of the substrates. Furthermore, in accordance with this disclosure, a hard coat layer is also formed over the replicated side of the media in order to impart mechanical integrity to the media. Printable layers, printed layers, lacquer, or other materials may also be added.

The elimination of the non-information bearing "dummy" substrate can reduce raw materials, thereby reducing costs and providing a more environmentally friendly optical disk. The hard coat layer can provide the mechanical protection to the replicated side of the approximately 0.6 millimeter substrate. In some cases, the hard coat layer may be formed over a reflective layer, replacing conventional lacquer and providing mechanical protection to the replicated side of the substrate. Printed or printable layers may be formed over the hard coat layer. In other cases, the hard coat layer may be formed over a layer of lacquer, where the lacquer is formed over the reflective layer to provide protection from oxidation of the reflective layer.

In one embodiment, this disclosure provides an optical data storage medium compatible with a digital versatile disk (DVD) drive. The medium comprises a disk-shaped thermoplastic substrate defining a first side and a second side, wherein the first side includes replicated features and wherein the disk-shaped thermoplastic substrate defines a thickness over a substantial majority of the disk-shaped thermoplastic substrate of approximately 0.6 millimeters, a reflective layer formed over the first side of the disk-shaped thermoplastic substrate such that light from the DVD drive can pass through the disk-shaped thermoplastic substrate and reflect off the reflective layer back to the DVD drive, and a hard coat layer formed over the reflective layer, wherein the hard coat layer protects the replicated features, and wherein the reflective layer and the hard coat layer are sufficiently thin relative to the disk-shaped thermoplastic substrate such that the overall thickness of the optical data storage medium over a substantial majority of the optical data storage medium is approximately 0.6 millimeters.

In another embodiment, this disclosure provides an optical data storage medium compatible with a DVD drive, the medium comprising a disk-shaped thermoplastic substrate defining a first side and a second side, wherein the first side includes replicated features and wherein the disk-shaped thermoplastic substrate defines a thickness over a substantial majority of the disk-shaped thermoplastic substrate of approximately 0.6 millimeters, an information layer formed over the first side of the disk-shaped thermoplastic substrate and the reflective layer, a reflective layer formed over the information layer such that light from the DVD drive can pass through the disk-shaped thermoplastic substrate to the information layer and reflect off the reflective layer back to the DVD drive so that the DVD drive can read the information layer, a hard coat layer formed over the reflective layer, wherein the hard coat layer protects the replicated features and provides protection against oxidation of the reflective layer, and a print layer formed over the hard coat layer, wherein the information layer, the reflective layer, the hard coat layer and the print layer are sufficiently thin relative to the disk-shaped thermoplastic substrate such that the overall thickness of the optical data storage medium over a substantial majority of the optical data storage medium is approximately 0.6 millimeters.

In another embodiment, this disclosure provides an optical data storage medium compatible with a DVD drive, the medium comprising a disk-shaped thermoplastic substrate defining a first side and a second side, wherein the first side includes replicated features and wherein the disk-shaped thermoplastic substrate defines a thickness over a substantial majority of the disk-shaped thermoplastic substrate of approximately 0.6 millimeters, an information layer formed over the first side of the disk-shaped thermoplastic substrate and the reflective layer, a reflective layer formed over the information layer such that light from the DVD drive can pass through the disk-shaped thermoplastic substrate to the information layer and reflect off the reflective layer back to the DVD drive so that the DVD drive can read the information layer, a lacquer layer formed over the reflective layer, wherein the lacquer layer provides protection against oxidation of the reflective layer, a hard coat layer formed over the lacquer layer, wherein the hard coat layer protects the replicated features, and a print layer formed over the hard coat layer, wherein the information layer, the reflective layer, the lacquer layer, the hard coat layer and the print layer are sufficiently thin relative to the disk-shaped thermoplastic substrate such that the overall thickness of the optical data storage medium over a substantial majority of the optical data storage medium is approximately 0.6 millimeters.

The details of one or more embodiments of this disclosure are set forth in the accompanying drawings and the description below. Other features, objects, and advantages of the media described in this disclosure will be apparent from the description and drawings, and from the claims.

DETAILED DESCRIPTION

This disclosure describes thin optical data storage media that may be compliant with conventional DVD drives. In this disclosure, the acronym "DVD" refers to a digital versatile disk, such as DVD, DVD-R, DVD-RW, DVD-ROM and HD-DVD. DVDs are also sometimes called "digital video disks," particularly when the disks are used to store video information, such as motion pictures. The optical media described in this disclosure are in many ways compliant with DVD standard specifications. However, unlike DVD standard specifications, which define DVD thickness at 1.2 millimeters, the optical media of this disclosure have a thinner profile than the standard DVD thickness profile. In particular, the described optical data storage media may have a thickness of approximately 0.6 millimeters. Accordingly, the thickness, mass, moment of inertia, and possibly other quantities associated with the optical data storage media described in this disclosure may be non-compliant with one or more DVD specifications. Nevertheless, the optical data storage media described in this disclosure may be readable, and thus, compatible, with DVD drives.

Unlike conventional DVDs, the optical data storage media described herein does not include the conventional non-information bearing "dummy" substrate. Conventional DVDs include two substrates that are bonded together. One of the substrates of conventional DVDs may include replicated features, data layers, reflectors, and the like to facilitate information storage and retrieval, while the other substrate may include no information or replicated features, essentially functioning as a "dummy" substrate that covers the information side of the replicated substrate.

Unlike conventional DVDs, the optical data storage media described in greater detail below may comprise a single substrate having a thickness of approximately 0.6 millimeters, which is half the thickness of conventional DVDs. The substrate may be replicated to define surface features, such as pits, lands, grooves, or the like. Depending on the format, reflective layers, information layers, dyes, phase change materials, lacquer layers, print layers, or other materials may be deposited, coated, or otherwise applied over the replicated side of the substrate. These additional layers may have negligible thicknesses relative to the substrate, such that the final optical data storage medium has a thickness of approximately 0.6 millimeters. In accordance with this disclosure, a hard coat layer is also formed over the replicated side of the media in order to provide mechanical integrity to the media. The hard coat layer may also have negligible thicknesses relative to the substrate, such that the final optical data storage medium has a thickness of approximately 0.6 millimeters.

By eliminating the non-information bearing "dummy" substrate from DVD-like optical media, a fifty percent reduction in substrate raw materials can be achieved, thereby reducing costs and providing a more environmentally friendly optical data storage medium. The hard coat layer can provide the mechanical protection to the replicated side of the 0.6 millimeter substrate, e.g., replacing the mechanical functionality commonly associated with conventional "dummy" substrates of conventional DVD constructions.

In some cases, the hard coat layer may be formed over a reflective layer, replacing conventional lacquer, providing mechanical protection to the replicated side of the substrate, and possibly providing protection against oxidation of the reflective layer. A print layer, such as one or more printed or printable layers, may be formed over the hard coat layer. Printable layers typically refer to screen printed layers that facilitate acceptance of inkjet layers or other printed layers. Printed layers refer to the inkjet layers or other printed layers. The term "print layer" refers to printed or printable layers.

In other cases, the hard coat layer may be formed over a layer of lacquer, where the lacquer is formed over the reflective layer to provide the protection against oxidation of the reflective layer. A number of different embodiments are described in greater detail below. These and other thin optical media configurations consistent with a single 0.6 millimeter substrate construction and a hard coat layer will become apparent from this disclosure.

Figure 1:
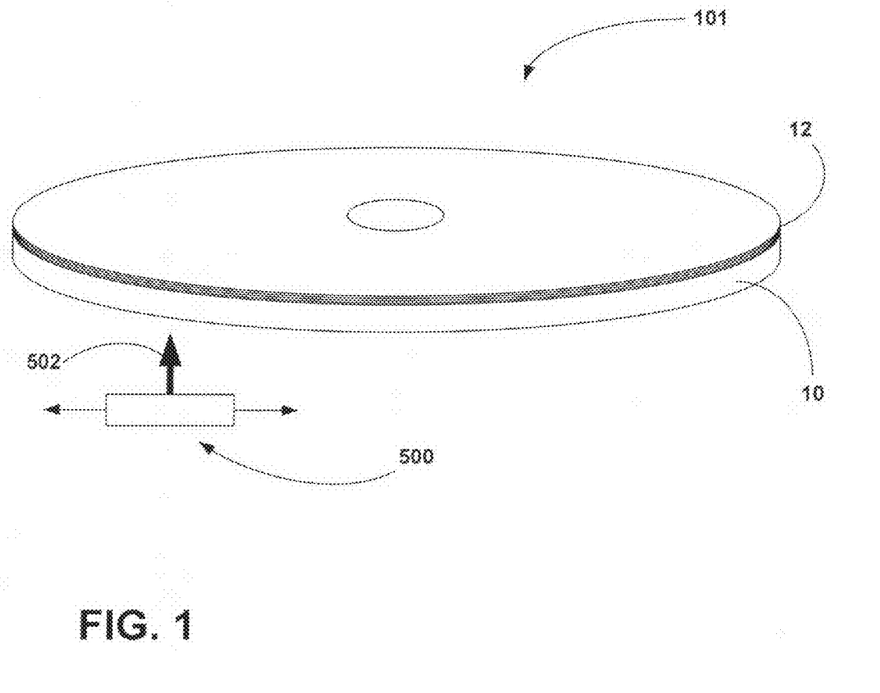
FIG. 1 is a perspective view of an exemplary optical data storage disk medium consistent with this disclosure, and a conceptual illustration of a drive element that emits light for reading the optical data storage medium.

FIG. 1 is a perspective view of an exemplary optical data storage medium 101 consistent with this disclosure. FIG. 1 also shows a conceptual illustration of a drive element 500 that emits light 502 for reading optical data storage medium 101. In accordance with this disclosure, optical data storage medium 101 comprises a thin substrate 10, which is a disk-shaped thermoplastic substrate defining a first side and a second side, wherein the first side includes replicated features and wherein the disk-shaped thermoplastic substrate 10 defines a thickness of approximately 0.6 millimeters. The first side of substrate 10, which includes the surface features, is the top side of substrate 10 in the illustration in FIG. 1. In this case, a drive can read information from medium 101 using a drive element 500 that passes light 502 through a second surface (the bottom surface) of substrate 10. Layers 12 may include reflective layers, information layers, or the like, to facilitate data storage. Light 502 passes through substrate 10, reflects off of layers 12, and the reflected light may be detected by the DVD drive for information readout. The DVD drive is conceptually illustrated by drive element 500, although the light detecting elements of the DVD drive, which detect the reflected light, are not shown for simplicity and ease of illustration.

In accordance with this disclosure, layers 12 include a hard coat layer. Again, layers 12 are formed over replicated features on the top surface of substrate 10. The hard coat layer acts as a mechanical protection layer to these replicated features on the top surface of substrate 10, which are often relatively fragile. Because optical data storage medium 101 does not include a conventional non-information bearing "dummy" substrate, the hard coat layer portion of layers 12 can be very important for structural integrity of optical data storage medium 101.

Medium 101 includes a reflective layer (which is included in layers 12). The reflective layer is formed over the first side of substrate 10 such that light from a DVD drive (e.g., light 502) can pass through substrate 10 and reflect off the reflective layer back to the DVD drive. The hard coat layer (which is also included in layers 12) is formed over the reflective layer, wherein the hard coat layer provides mechanical integrity to protect the replicated features on the first side of substrate 10. Layers 12 (including the reflective layer, the hard coat layer and any other layers) are sufficiently thin relative to substrate 10 such that the overall thickness of optical data storage medium 101 is approximately 0.6 millimeters.

While the thickness of substrate 10 may be approximately 0.6 millimeters, this thickness may correspond to the major surface of substrate and may not include non-information areas such as the inner diameter of substrate 10. For example, it may be desirable to provide additional thickness (or features that effectively provide such additional thickness) at the inner diameter of substrate 10. In this way, a clamping area may be defined at the inner diameter of substrate 10, and this clamping area may define a 1.2 millimeter thickness consistent with DVD specifications. Put another way, although substrate 10 may be approximately 0.6 millimeters thick, substrate 10 may include additional features that increase thickness in selected and non-substantial areas of substrate, such as the inner, diameter. Therefore, substrate 10 may define a thickness over a substantial majority of substrate 10 that is 0.6 millimeters, but still have features that increase its thickness at the inner diameter of substrate 10 or in other small areas. Greater than 90 percent of the surface of substrate 10 may define the 0.6 millimeter thickness, and in most cases, the entire surface of substrate 10 may define the 0.6 millimeter thickness.

FIGS. 2-9 are exploded perspective views of optical data storage media consistent with this disclosure. The different optical data storage media illustrated in FIGS. 2-9 may correspond to optical data storage medium 101 shown in FIG. 1. FIGS. 2-9 illustrate different optical data storage media constructions, but use common numbers to label similar layers that may be included in the different optical data storage media. In particular, in the different embodiments of FIGS. 2-9, each substrate is labeled as substrate 10, each reflective layer is labeled as reflective layer 20, each hard coat layer is labeled as hard coat layer 30, each lacquer layer is labeled as lacquer layer 40. Each print layer is labeled as print layer 50, and each information layer is labeled as information layer 60. Importantly, the different optical data storage media illustrated in FIGS. 2-9 may be compliant with a DVD drive. A DVD drive refers to a drive that is compliant with any of a wide variety of DVD media, such as DVD, DVD-R, DVD-RW, DVD-ROM and HD-DVD.

The different optical data storage media illustrated in FIGS. 2-9 are thinner than conventional DVD media, but may still function in conventional DVD drives. In each of the embodiments shown in FIGS. 2-9, substrate 10 may comprise a disk shaped thermoplastic substrate having a thickness of approximately 0.6 millimeters. The other layers of the different optical data storage media illustrated in FIGS. 2-9 may define negligible thickness relative to substrate 10 such that the overall thicknesses of the different optical data storage media illustrated in FIGS. 2-9 are approximately 0.6 millimeters.

Figure 2:
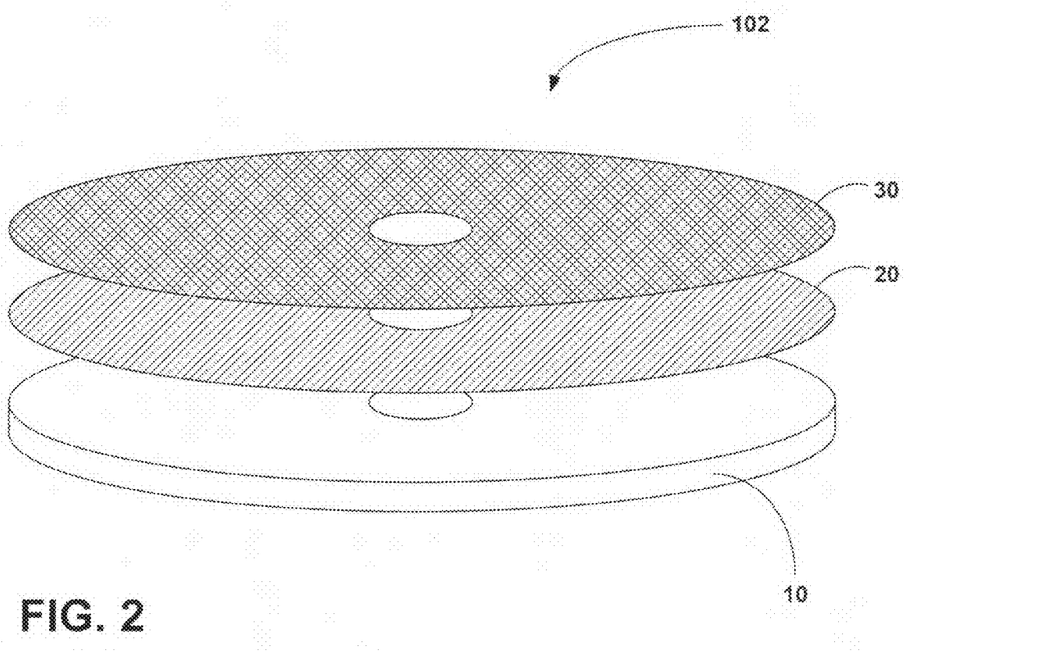
FIGS. 2-9 are exploded perspective views of optical data storage disk media consistent with this disclosure.

As shown in FIG. 2, optical data storage medium 102 includes a disk-shaped thermoplastic substrate 10 formed with replicated features on a first side (e.g., a top side) of optical data storage medium 102. Optical data storage medium 102 also includes a reflective layer 20 formed over the first side of substrate 10, and a hard coat layer 30 formed over reflective layer 20. Additional layers may also exist on top of hard coat layer 30 or between the various layers. However, in one embodiment, optical data storage medium 102 consists essentially of substrate 10, and layers 20 and 30. In this case, reflective layer 20 is formed directly on substrate, and hard coat layer 30 is formed directly on reflective layer 20. Optical data storage medium 102 may comprise a DVD-read only memory (ROM) with a substantially thin profile.

Reflective layer 20 and hard coat layer 30 may be deposited via thin film deposition techniques, spin coated, or applied via any optical disk fabrication technique. The replicated features on the first side of optical data storage medium 102 may be injection molded lands and grooves formed when optical data storage medium 102 is molded, or may be created via a photo-polymerization process in which the lands and grooves are photo-polymerized onto an otherwise flat substrate. In either case, hard coat layer 30 adds structural integrity to optical data storage medium 102 and protects the replicated features on the first side of optical data storage medium 102 from damage during the handling and use of optical data storage medium 102.

Reflective layer 20 may comprise a metal layer, such as silver, gold, aluminum, palladium, or alloys thereof. Silver and silver-based alloys may be preferred materials for the reflector layer. Exemplary silver alloys can be purchased from suppliers like William Advanced Materials (such as Sil-X) and Target Technology Company (such as TTP35-A, TTP40-A, TTP53-A and TTP56-A). Generally, reflective layer 20 may comprise any material that provides sufficient reflection characteristics for information readout of optical data storage medium 102. Reflective layer 20 is typically deposited over substrate 10 in a deposition chamber, although reflective layer 20 could be applied in other ways. Reflective layer 20 may have a thickness between approximately 10 nanometers and 200 nanometers. This range is true for most metallic reflectors like those described above. In some cases, layer 20 may have a thickness between approximately 60 nanometers and 160 nanometers.

Hard coat layer 30 may comprise ForceField or Nano4 hard coats developed by Imation Corp. In other cases, hard coat 30 may comprise a UV-curable hard coat commercially available from Sony Chemicals. An example of a hard coat from Sony Chemicals is SK1120(06A-106X-2). TDK Company also has a hard coat named Durabis, which could be used. Generally, hard coat layer 30 may comprise any material that provides sufficient mechanical integrity to the surface of optical data storage medium 102 to protect replicated features on the top side of substrate 10. Hard coat layer 30 is typically deposited over reflector 20 in a deposition chamber, or spin coated over reflective layer 20, although hard coat layer 30 could be applied in other ways. Hard coat layer 30 may have a thickness between approximately 0.1 micron and 20 microns, with a preferred thickness range between approximately 1 micron and 10 microns.

Hard coat layer 30 may define a pencil hardness of approximately HB to 9H. Pencil hardness is a measurable quality of scratch resistance. Some hard coatings may have a pencil hardness of F. The Sony hard coat SK1120(06A-106X-2) has a pencil hardness of 3H. A pencil hardness of F or greater is preferred.

The phrase "pencil hardness" is commonly used to measure the hardness and resistance of varnishes and paints. The resistance of a coating (also known as its pencil hardness) is determined as the grade of the hardest pencil that does not mark the coating when pressed firmly against it at a 45 degree angle. Pencil hardness may have a range from hardness to softest of "9H, 8H, 7H, 6H, 5H, 4H, 3H, 2H, H, F, HB, B, 2B, 3B, 4B, 5B, 6B, 7B, 8B, 9B." As mentioned, a pencil hardness greater than F may be preferred for the hard coat, with a typical range being between HB and 9H.

Figure 3:
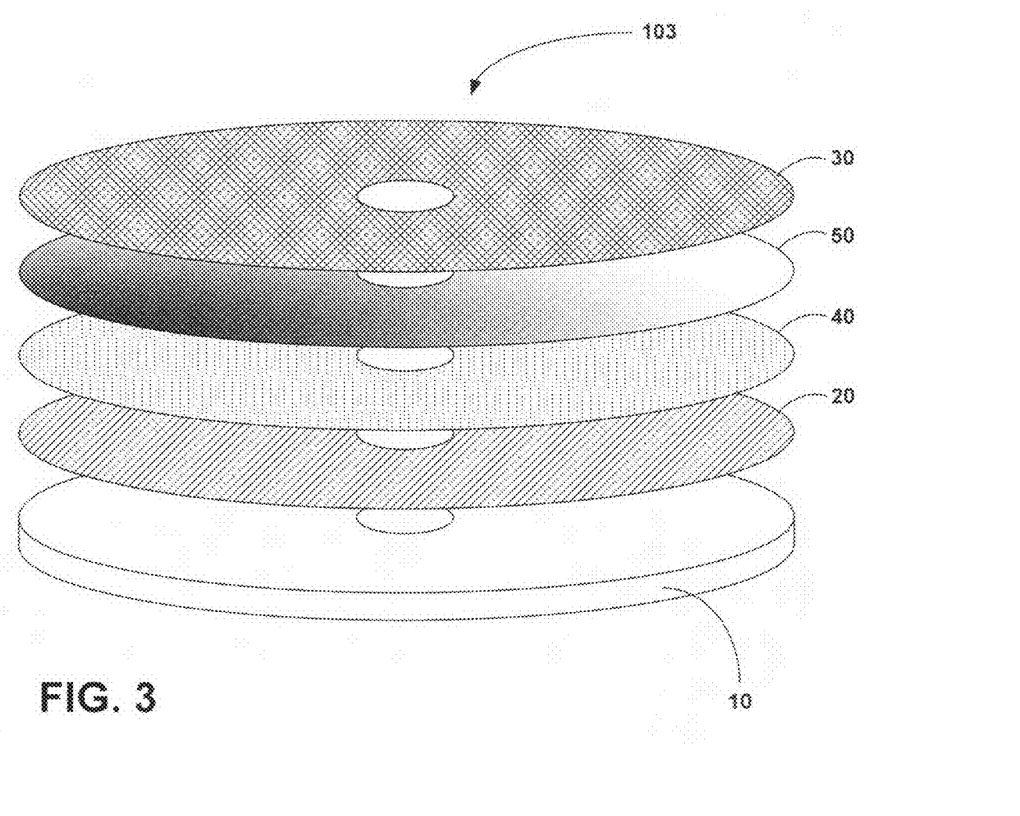

FIG. 3 illustrates an optical data storage medium 103 that includes a disk-shaped thermoplastic substrate 10 formed with replicated features on a first side (e.g., a top side) of optical data storage medium 103. Optical data storage medium 103 also includes a reflective layer 20 formed over the first side of substrate 10, and a lacquer layer 40 formed over reflective layer 20. Lacquer layer 40 can provide protection against oxidation of reflective layer 20.

Optical data storage medium 103 also includes a print layer 50, which, in this example, may comprise a printed layer that includes inks to present artwork or a label on optical data storage medium 103. Finally, optical data storage medium 103 also includes a hard coat layer 30 formed over print layer 50. Additional layers may also exist on top of hard coat layer 30 or between the various layers. However, in one embodiment, optical data storage medium 103 consists essentially of substrate 10, reflective layer 20, lacquer layer 40, print layer 50 and hard coat layer 30. In this case, reflective layer 20 is formed directly on substrate 10, lacquer layer 40 is formed directly on reflective layer 20, print layer 50 is formed directly on lacquer layer 40, and hard coat layer 30 is formed directly on print layer 50. Optical data storage medium 103 may comprise a DVD-ROM medium with a substantially thin profile.

Reflective layer 20 may be deposited via thin film deposition techniques, spin coated, or applied via any optical disk fabrication technique. Lacquer layer 40 may be applied via spin coating or another technique. Print layer 50 may be applied via screen printing, ink jet printing, or another printing technique. Hard coat layer 30 may be formed via thin film deposition techniques, spin coating techniques, or another technique. The replicated features on the first side (e.g., the top side in the illustration of FIG. 3) of optical data storage medium 103 may be injection molded lands, grooves, pits, and/or other surface features formed when optical data storage medium 103 is molded, or may be created via a photo-polymerization process in which the lands, grooves, pits and/or other surface features are photo-polymerized onto an otherwise flat substrate. In either case, hard coat layer 30 adds structural integrity to optical data storage medium 103 and protects the replicated features on the first side of optical data storage medium 103 from damage during the handling and use of optical data storage medium 103.

Reflective layer 20 of optical data storage medium 103 may comprise a metal layer, such as silver, gold, aluminum, palladium, or alloys containing at least one of these metals. Generally, reflective layer 20 may comprise any material that provides sufficient reflection characteristics for information readout of optical data storage medium 103. Reflective layer 20 is typically deposited over substrate 10 in a deposition chamber, although reflective layer 20 could be applied in other ways. Reflective layer 20 may have a thickness of approximately 100 nanometers.

Lacquer layer 40 may define a thickness of approximately 1 micron and 20 microns. Print layer 50 may define any thickness, depending upon the amount of print material used. The print layer is not necessarily uniform. Generally, hard coat layer 30 may comprise any material that provides sufficient mechanical integrity to the surface of optical data storage medium 103 to protect replicated features on the top side of substrate 10.

As an example, hard coat layer 30 may comprise SK1120 (06A-106X-2) from Sony Chemicals. Hard coat layer 30 is typically deposited over print layer 50 in a deposition chamber, or spin coated over print layer 50, although hard coat layer 30 could be applied in other ways. Hard coat layer 30 may have a thickness between approximately 1 micron and 10 microns. Hard coat layer 30 may define a hardness between approximately F and 4H, as defined by so-called "pencil hardness."

In the example of FIG. 3, print layer 50 may comprise a printed layer that includes graphics or artwork. In the example of FIG. 3, print layer 50 may be a located underneath hard coat layer 30. Therefore, in this example, print layer 50 may be created during disk fabrication. Optical data storage medium 103 may comprise a ROM-DVD with artwork in print layer 50 being created during disk manufacture. In other examples, where the print layer is the outermost layer of the media described herein, the print layer may be printed or printable such that users may add additional printing over the printable layer.

Figure 4:
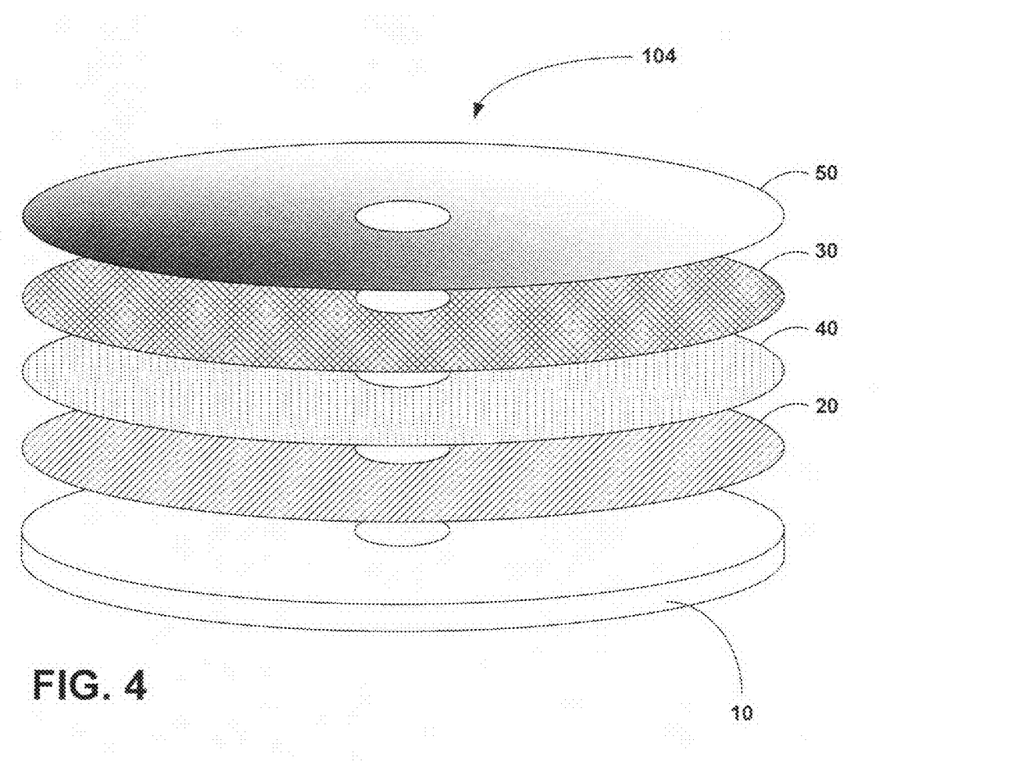

FIG. 4 illustrates another optical data storage medium 104 that includes a disk-shaped thermoplastic substrate 10 formed with replicated features on a first side (e.g., a top side) of optical data storage medium 104. Optical data storage medium 104 also includes a reflective layer 20 formed over the first side of substrate 10, and a lacquer layer 40 formed over reflective layer 20. Lacquer layer 40 can provide protection against oxidation of reflective layer.

Optical data storage medium 104 also includes a hard coat layer 30 formed over lacquer layer 40, and a print layer 50 formed over hard coat layer 30. Thus, optical data storage medium 104 is very similar to optical data storage medium 103 of FIG. 3, but has the order of hard coat layer 30 and print layer 50 changed so that print layer 50 is the outermost layer. Print layer 50 may comprise a printable layer or a printed layer.

As with other embodiments, additional layers may also exist between the various layers of optical data storage medium 104, shown in FIG. 4. However, in one embodiment, optical data storage medium 104 consists essentially of substrate 10, reflective layer 20, lacquer layer 40, hard coat layer 30, and print layer 50. In this case, reflective layer 20 is formed directly on substrate 10, lacquer layer 40 is formed directly on reflective layer 20, hard coat layer 30 is formed directly on lacquer layer 40, and print layer 50 is formed directly on hard coat layer 30. Optical data storage medium 104 may comprise a DVD-ROM medium with a substantially thin profile.

As with other embodiments, reflective layer 20 may be deposited via thin film deposition techniques, spin coated, or applied via any optical disk fabrication technique. Lacquer layer 40 may be applied via spin coating or another technique. Hard coat layer 30 may be formed via thin film deposition techniques, spin coating techniques, or other techniques. Print layer 50 may be applied via screen printing, ink jet printing, or another printing technique. The replicated features on the first side of substrate 10 of optical data storage medium 104 may be injection molded lands, grooves, pits, or other surface features, which are formed when substrate 10 is molded or photo-polymerized. As with other embodiments, hard coat layer 30 adds structural integrity to optical data storage medium 104 and protects the replicated features on the first side of substrate 10 from damage during the handling and use of optical data storage medium 104.

Reflective layer 20 of optical data storage medium 104 may comprise a metal layer, such as silver, gold, aluminum, palladium, or alloys thereof. Generally, reflective layer 20 may comprise any material that provides sufficient reflection characteristics for information readout of optical data storage medium 102. Reflective layer 20 is typically deposited over substrate 10 in a deposition chamber, although reflective layer 20 could be applied in other ways. Reflective layer 20 may have a thickness of approximately 120 nanometers.

Lacquer layer 40 may define a thickness of approximately 5 microns to 15 microns. Generally, hard coat layer 30 may comprise any material that provides sufficient mechanical integrity to the surface of optical data storage medium 104 to protect replicated features on the top side of substrate 10. In the example of FIG. 4, print layer 50 is formed over hard coat layer 30 so that the outermost layer is the print layer. Print layer 50 may be a screen printed layer that facilitates the acceptance of inks, e.g., via an end-user printing process over print layer 50.

Hard coat layer 30 may comprise SK1120(06A-106X-2) from Sony Chemicals. Hard coat layer 30 is typically deposited over lacquer layer 40 prior to the formation of print layer 50. However, hard coat layer 30 could be applied in other ways, such as via spin coating, or other layer application techniques. Hard coat layer 30 may have a thickness between approximately 1 micron and 10 microns. Hard coat layer 30 may define a hardness of approximately F to 4H, as defined by so-called "pencil hardness."

Figure 5:
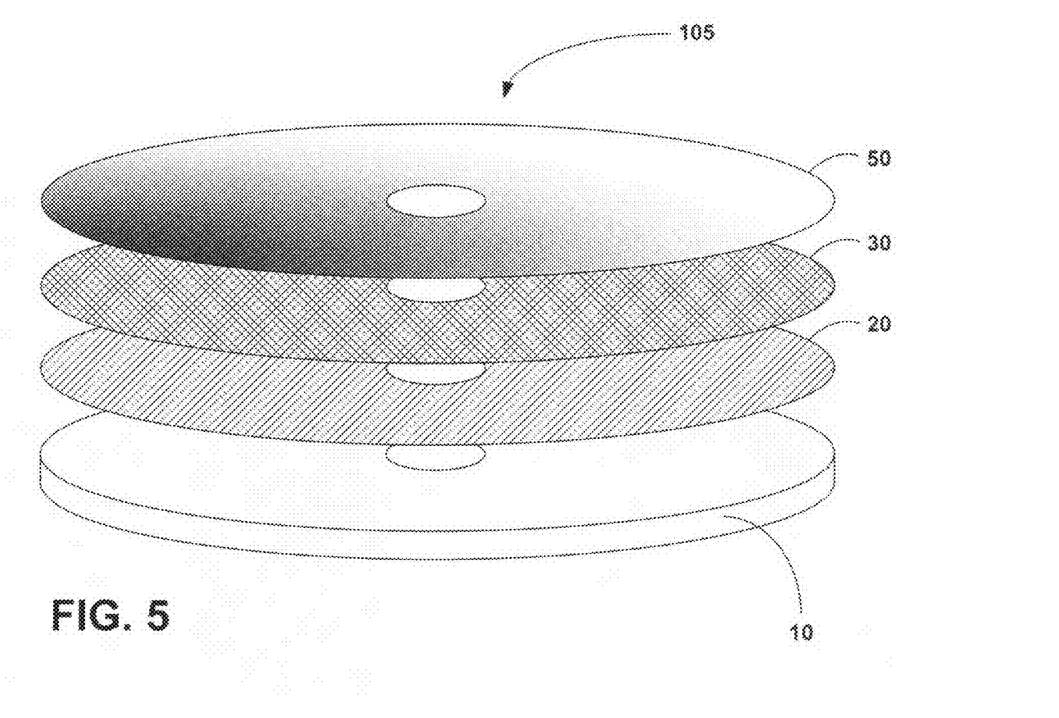

FIG. 5 illustrates another optical data storage medium 105 that includes a disk-shaped thermoplastic substrate 10 formed with replicated features on a first side (e.g., a top side) of substrate 10. Optical data storage medium 105 also includes a reflective layer 20 formed over the first side of substrate 10, a hard coat layer 30 formed over reflective layer 20, and a print layer 50 formed over hard coat layer 30. Thus, optical data storage medium 105 of FIG. 5 is very similar to optical data storage medium 104 of FIG. 4, but eliminates lacquer layer 40. In this case, hard coat layer 30 may serve as both a hard coat and a protective layer against oxidation of reflective layer 20. That is, hard coat layer 30 may be formulated to both provide hard coat protection, and to provide protection against oxidation of reflective layer 20. In this manner, hard coat layer 30 may be formulated so that a lacquer layer may be omitted from optical data storage medium 105.

As with other embodiments, additional layers may also exist between the various layers. However, in one embodiment, optical data storage medium 105 consists essentially of substrate 10, reflective layer 20, hard coat layer 30, and print layer 50. In this case, reflective layer 20 is formed directly on substrate 10, hard coat layer 30 is formed directly on reflective layer 20, and print layer 50 is formed directly on hard coat layer 30. Optical data storage medium 105 may comprise a DVD-ROM medium with a substantially thin profile. The various layers may be deposited, spin coated, or otherwise applied in any manner described herein. In addition, the various layers of optical data storage medium 105 may comprise the materials and thicknesses described above with respect to other embodiments.

Figure 6:
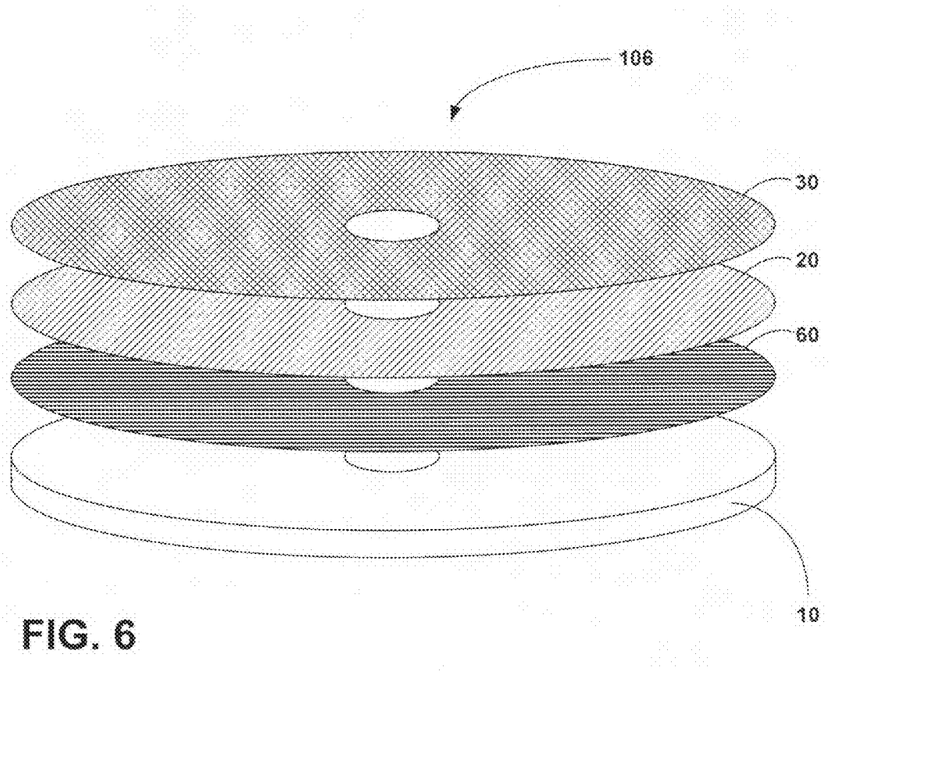

FIG. 6 illustrates another optical data storage medium 106 that includes a disk-shaped thermoplastic substrate 10 formed with replicated features on a first side (e.g., a top side) of optical data storage medium 106. As with the other embodiments described herein, substrate 10 may define a thickness of approximately 0.6 millimeters, and optical data storage medium 106 may comprise a DVD-drive compatible medium that defines a thinner profile than conventional DVDs by eliminating the non-information bearing "dummy" substrate, and replacing this dummy substrate with a hard coat.

Optical data storage medium 106 includes an information layer 60 formed over the first side of substrate 10, a reflective layer 20 formed over information layer 60, and a hard coat layer 30 formed over reflective layer 20. Optical data storage medium 106 may comprise a DVD-rewritable (RW) or a DVD-recordable (R) medium. In the case where data storage medium 106 is a DVD-RW, information layer 60 may comprise a phase change stack. In the case where data storage medium 106 is a DVD-R, information layer 60 may comprise a recordable dye.

Examples of phase change stacks for information layer 60 include a multi-layer stack comprising the following materials: Ag(alloy)/Si/ZnS:SiO2/Sb:Te:Ge/ZnS:SiO2/Si. The materials may be deposited in the order listed to define information layer 60, which, in this case, may define a thickness between approximately 50 nanometers and 500 nanometers. These or other materials may be deposited or otherwise applied over replicated features on the top side of substrate 10 to define a reflective surface. In this way, optical rewritable recording and readout techniques may be used to read information layer 60 by exposing information layer 60 to light through substrate 10, and reflecting light off of reflective layer 20.

Examples of dyes for information layer 60 include Phthalocyanine, Cyanine and Azo. In this case, information layer 60 may define a thickness between approximately 30 nanometers and 300 nanometers. In this way, optical recording and readout techniques may be used to read information layer 60 by exposing information layer 60 to light through substrate 10, and reflecting light off of reflective layer 20.

Examples of reflective layer 20 include silver, gold, aluminum, palladium, and silver alloys like an Sil-X alloy and one of the TTP alloys mentioned above. These or other reflective materials may be deposited or otherwise applied over information layer 60 so that light can be reflected for information recording and readout of data in information layer 60. Reflective layer 30 may have a thickness between approximately 10 nanometers and 200 nanometers.

Hard coat layer 30 may comprise ForceField or Nano4 hard coats from Imation Corp., or commercially any available hard coats such as the Sony Chemicals SK1120(06A-106X-2). Hard coat layer 30 is typically deposited over reflective layer 20. However, hard coat layer 30 could be applied in other ways, such as spin coating, or other layer application techniques. Hard coat layer 30 may have a thickness of approximately 1 micron to 10 microns. Hard coat layer 30 may define a pencil hardness of approximately F or greater.

As with other embodiments, additional layers may also exist between the various layers of optical data storage medium 106. However, in one embodiment, optical data storage medium 106 consists essentially of substrate 10, information layer 60, reflective layer 20, and hard coat layer 30. In this case, information layer 60 is formed directly on substrate 10, reflective layer 20 is formed directly on information layer 60, and hard coat layer 30 is formed directly on reflective layer 20. Optical data storage medium 106 may comprise a DVD-RW or a DVD-R medium with a substantially thin profile.

Figure 7:
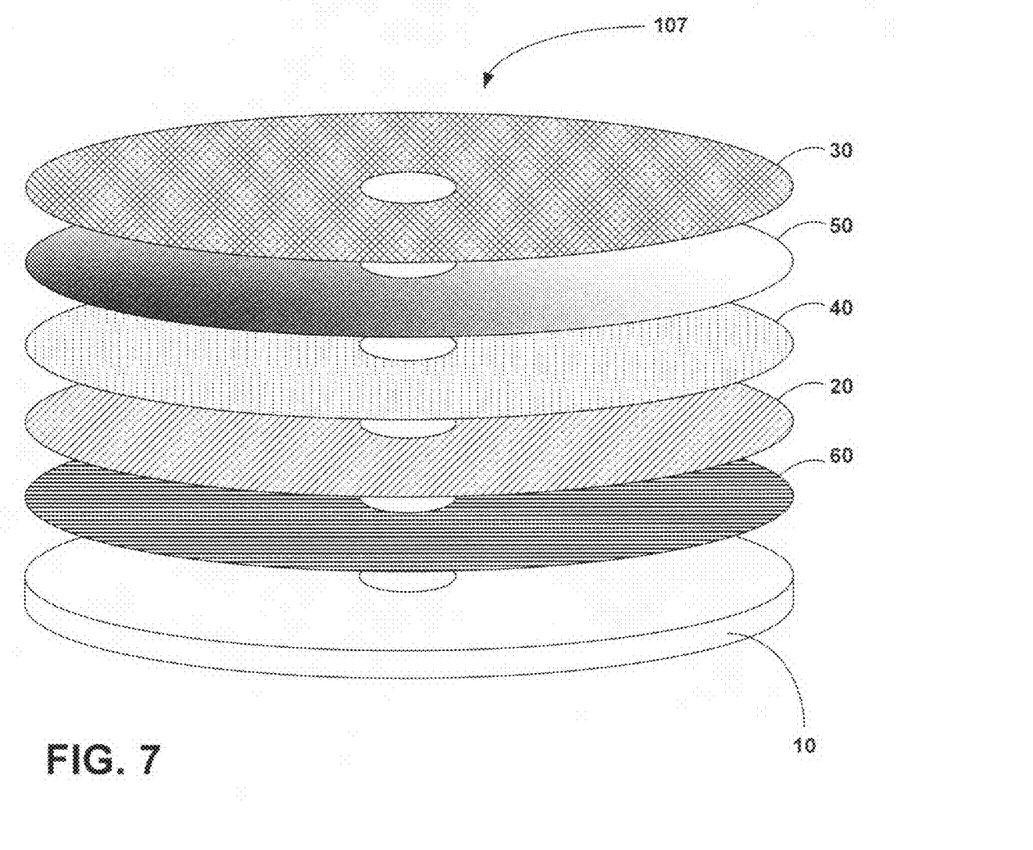

FIG. 7 illustrates another optical data storage medium 107 that includes a disk-shaped thermoplastic substrate 10 formed with replicated features on a first side (e.g., a top side) of optical data storage medium 107. As with the other embodiments described herein, substrate 10 may define a thickness of approximately 0.6 millimeters, and optical data storage medium 107 may comprise a DVD-drive compatible medium that defines a thinner profile than conventional DVDs by eliminating the non-information bearing "dummy" substrate, and replacing this dummy substrate with a hard coat.

Optical data storage medium 107 includes an information layer 60 formed over the first side of substrate 10, a reflective layer 20 formed over information layer 60, a lacquer layer 40 formed over reflective layer 20, a print layer 50 formed over lacquer layer 40, and a hard coat layer 30 formed over print layer 50. Optical data storage medium 107 may comprise a DVD-rewritable (RW) or a DVD-recordable (R) medium. In the case where data storage medium 107 is a DVD-RW, information layer 60 may comprise a phase change stack. In the case where data storage medium 107 is a DVD-R, information layer 60 may comprise a dye.

Again, examples of phase change stacks, which may be used for information layer 60, include a stack of the following: Ag(alloy)/Si/ZnS:SiO2/Sb:Te:Ge/ZnS:SiO2/Si. In this case, information layer 60 may define a thickness between approximately 50 nanometers and 500 nanometers. These or other materials may be deposited or otherwise applied over replicated features on the top side of substrate 10 to define a reflective surface. In this way, optical rewritable recording and readout techniques may be used to read information layer 60 by exposing information layer 60 to light through substrate 10, and reflecting light off of reflective layer 20.

Examples of dyes, which may be used for information layer 60, for information layer 106 include Phthalocyanine, Cyanine and Azo. In this case, information layer 60 may define a thickness between approximately 30 nanometers and 300 nanometers. In this way, optical recording and readout techniques may be used to read information layer 60 by exposing information layer 60 to light through substrate 10, and reflecting light off of reflective layer 20.

Examples of reflective layer 20 include silver, gold, aluminum, palladium, and silver alloys like an Sil-X alloy and one of the TTP alloys mentioned above. These or other reflective materials may be deposited or otherwise applied over information layer 60 so that light can be reflected for information recording and readout of data in information layer 60.

Lacquer layer 40 may be applied via spin coating or another technique. Print layer 50 may be applied via screen printing, ink jet printing, or another printing technique. Hard coat layer 30 may be formed via thin film deposition techniques, spin coated, or another technique. The replicated features on the first side of optical data storage medium 107 may be injection molded lands and grooves formed when optical data storage medium 107 is molded, or may be created via a photo-polymerization process in which the lands and grooves are photo-polymerized onto an otherwise flat substrate. In either case, hard coat layer 30 adds structural integrity to optical data storage medium 107 and protects the replicated features on the first side of optical data storage medium 107 from damage during the handling and use of optical data storage medium 107.

Lacquer layer 40 may define a thickness between approximately 1 micron and 20 microns. Print layer 50 may define a uniform on non-uniform thickness. Generally, hard coat layer 30 may comprise any material that provides sufficient mechanical integrity to the surface of optical data storage medium 107 to protect replicated features on the top side of substrate 10. As an example, hard coat layer 30 may comprise ForceField or Nano4 hard coats from Imation Corp., or commercially available hard coats such as the Sony Chemicals SK1120(06A-106X-2) hard coat. Hard coat layer 30 is typically deposited over print layer 50 in a deposition chamber, or spin coated over print layer 50, although hard coat layer 30 could be applied in other ways. Hard coat layer 30 may have a thickness between approximately 2 microns and 10 microns, and may define a pencil hardness between approximately F and 4H.

As with other embodiments, additional layers may also exist between the various layers of optical data storage medium 107. However, in one embodiment, optical data storage medium 107 consists essentially of substrate 10, information layer 60, reflective layer 20, lacquer layer 40, print layer 50, and hard coat layer 30. In this case, information layer 60 is formed directly on substrate 10, reflective layer 20 is formed directly on information layer 60, lacquer layer 40 is formed directly on reflective layer 20, print layer 50 is formed directly on lacquer layer 40, and hard coat layer 30 is formed directly on print layer 50. Optical data storage medium 107 may comprise a DVD-RW or a DVD-R medium with a substantially thin profile.

Figure 8:
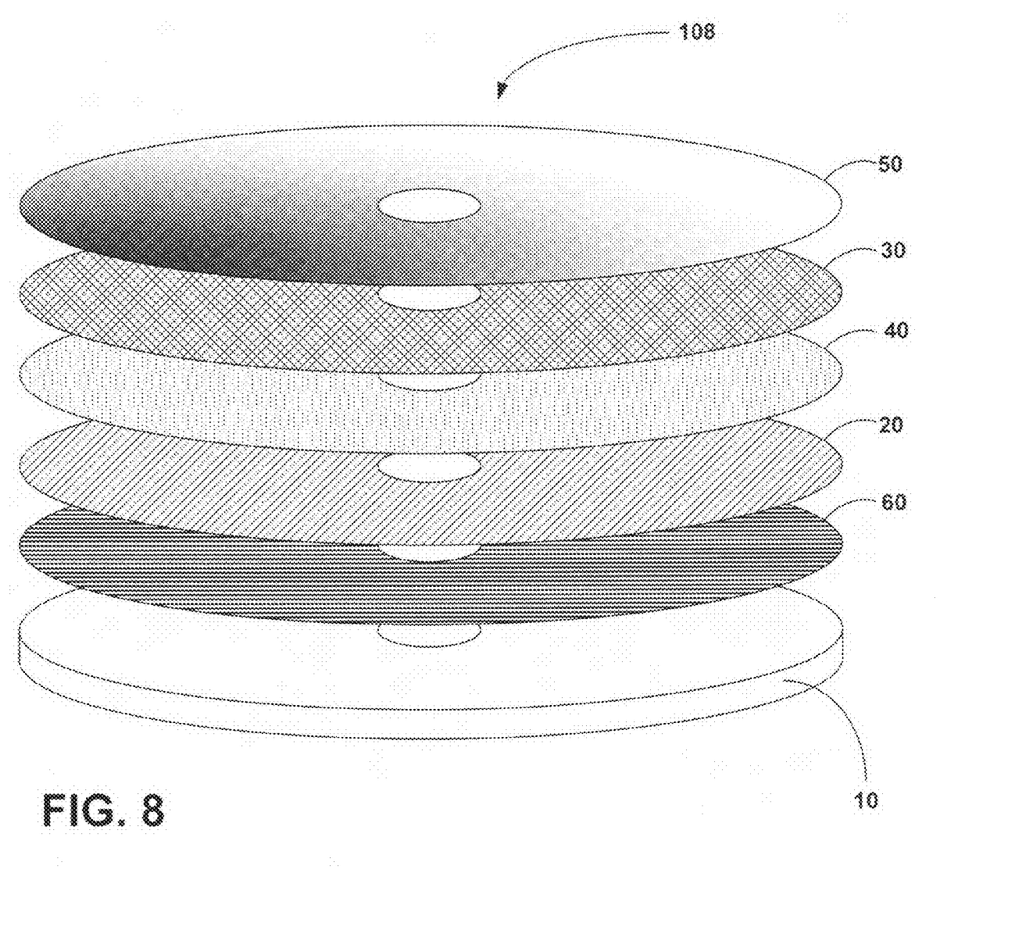

FIG. 8 illustrates another optical data storage medium 108 that includes a disk-shaped thermoplastic substrate 10 formed with replicated features on a first side (e.g., a top side) of optical data storage medium 108. Optical data storage medium 108 also includes an information layer 60 formed over the first side of substrate 10, a reflective layer 20 formed over information layer 60, a lacquer layer 40 formed over reflective layer 20, a hard coat layer 30 formed over lacquer layer 40, and a print layer 50 formed over hard coat layer 30. Optical data storage medium 108 may comprise a DVD-rewritable (RW) or a DVD-recordable (R) medium. In the case where data storage medium 108 is a DVD-RW, information layer 60 may comprise a phase change stack. In the case where data storage medium 108 is a DVD-R, information layer 60 may comprise a dye.

Lacquer layer 40 can provide protection against oxidation of reflective layer 20. Optical data storage medium 108 is very similar to optical data storage medium 107 of FIG. 7, but has the order of hard coat layer 30 and print layer 50 changed so that print layer 50 is the outermost layer. In this example, print layer 50 may comprise a printable layer or a printed layer.

As with other embodiments, additional layers may also exist between the various layers. However, in one embodiment, optical data storage medium 108 consists essentially of substrate 10, information layer 60, reflective layer 20, lacquer layer 40, hard coat layer 30, and print layer 50. In this case, information layer 60 is formed directly on substrate 10, reflective layer 20 is formed directly on information layer 60, lacquer layer 40 is formed directly on reflective layer 20, hard coat layer 30 is formed directly on lacquer layer 40, and print layer 50 is formed directly on hard coat layer 30. Optical data storage medium 108 may comprise a DVD-rewritable (RW) or a DVD-recordable (R) medium.

As noted, information layer 60 may comprise a phase change stack, e.g., in the example of DVD-RW, or may comprise a dye, e.g., in the example of DVD-R. Other types of information layers may also be used. Again, examples of phase change stacks, which may be used for information layer 60, include a multi-layer stack including the following: Ag(alloy)/Si/ZnS:SiO2/Sb:Te:Ge/ZnS:SiO2/Si. In this case, information layer 60 may define a thickness of approximately 50 nm to 500 nm. These or other materials may be deposited or otherwise applied over replicated features on the top side of substrate 10 to define a reflective surface. In this way, optical rewritable recording and readout techniques may be used to read information layer 60 by exposing information layer 60 to light through substrate 10, and reflecting light off of reflective layer 20.

Examples of dyes, which may be used for information layer 60, for information layer 106 include Phthalocyanine, Cyanine and Azo. In this case, information layer 60 may define a thickness of approximately 30 nm to 300 nm. In this way, optical recording and readout techniques may be used to read information layer 60 by exposing information layer 60 to light through substrate 10, and reflecting light off of reflective layer 20.

Reflective layer 20 of optical data storage medium 104 may comprise a metal layer, such as silver, gold, aluminum, palladium, or alloys thereof. Generally, reflective layer 20 may comprise any material that provides sufficient reflection characteristics for information readout of optical data storage medium 108. Reflective layer 20 is typically deposited over information layer 60 in a deposition chamber, although reflective layer 20 could be applied in other ways. Reflective layer 20 may have a thickness of approximately 10 microns to 200 microns.

Lacquer layer 40 may define a thickness of approximately 5 microns to 15 microns. Generally, hard coat layer 30 may comprise any material that provides sufficient mechanical integrity to the surface of optical data storage medium 108 to protect replicated features on the top side of substrate 10. In the example of FIG. 8, print layer 50 is formed over hard coat layer 30 so that the outermost layer is the print layer. Print layer 50 may be a screen printed layer that facilitates the acceptance of inks, e.g., via an end-user printing process over print layer 50.

Hard coat layer 30 may comprise ForceField or Nano4 hard coats from Imation Corp., or commercially available hard coats such as the Sony Chemicals hard coat sold under the product number SK1120(06A-106X-2). Hard coat layer 30 is typically deposited over lacquer layer 40 prior to the formation of print layer 50. However, hard coat layer 30 could be applied in other ways, such as spin coating, or other layer application techniques. Hard coat layer 30 may have a thickness of approximately 1 micron and 10 microns, and may define a pencil hardness within a range of approximately F to 4H.

Figure 9:
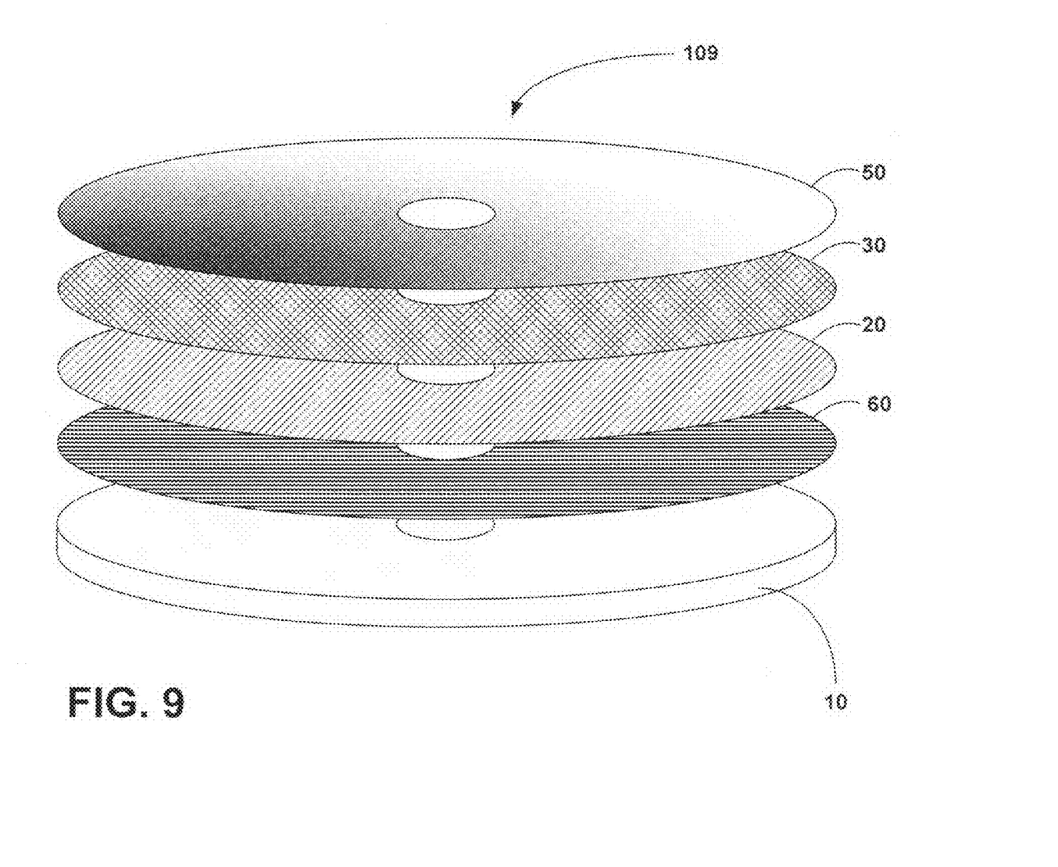

FIG. 9 illustrates another optical data storage medium 109 that includes a disk-shaped thermoplastic substrate 10 formed with replicated features on a first side (e.g., a top side) of substrate 10. Optical data storage medium 109 includes an information layer 60 formed over the first side of substrate 10, a reflective layer 20 formed over information layer 60, a hard coat layer 30 formed over reflective layer 20, and a print layer 50 formed over hard coat layer 30. Thus, optical data storage medium 109 is very similar to optical data storage medium 108 of FIG. 8, but eliminates lacquer layer 40. In this case, hard coat layer 30 may serve as both a hard coat and a protective layer against oxidation of reflective layer 20. That is, hard coat layer 30 may be formulated to both provide hard coat protection, and to provide protection against oxidation of reflective layer 20.

As with other embodiments, additional layers may also exist between the various layers. However, in one embodiment, optical data storage medium 109 consists essentially of substrate 10, information layer 60, reflective layer 20, hard coat layer 30, and print layer 50. In this case, information layer 60 is formed directly on substrate 10, reflective layer 20 is formed directly on information layer 60, hard coat layer 30 is formed directly on reflective layer 20, and print layer 50 is formed directly on hard coat layer 30. Optical data storage medium 109 may comprise a DVD-RW or DVD-R medium with a substantially thin profile. In the case of DVD-RW, information layer 60 may comprise a phase change stack, while in the case of DVD-R, information layer 60 may comprise a dye. The various layers may be deposited, spin coated, or otherwise applied in any manner described herein. In addition, the various layers of optical data storage medium 109 may comprise the materials and thicknesses described above with respect to other embodiments. The exemplary layer constructions and thicknesses described herein with respect to other embodiments may also apply to optical data storage medium 109 of FIG. 9.

Various embodiments have been described. These and other embodiments are within the scope of the following claims.

The invention claimed is:

1. An optical data storage medium compatible with a digital versatile disk (DVD) drive, the medium comprising:
    a disk-shaped thermoplastic substrate defining a first side and a second side, wherein the first side includes replicated features and wherein the disk-shaped thermoplastic substrate defines a thickness over a substantial majority of the disk-shaped thermoplastic substrate of approximately 0.6 millimeters;
    a reflective layer formed directly on the first side of the disk-shaped thermoplastic substrate such that light from the DVD drive can pass through the disk-shaped thermoplastic substrate and reflect off the reflective layer back to the DVD drive; and a hard coat layer formed directly on the reflective layer, wherein the hard coat layer protects the replicated features, and wherein the reflective layer and the hard coat layer are sufficiently thin relative to the disk-shaped thermoplastic substrate such that the overall thickness of the optical data storage medium over a substantial majority of the optical data storage medium is approximately 0.6 millimeters.

2. The optical data storage medium of claim 1, wherein the disk-shaped thermoplastic substrate is injection molded to define the replicated features on the first side.

3. The optical data storage medium of claim 1, wherein the disk-shaped thermoplastic substrate comprises a substantially flat substrate with the replicated features on the first side being photo-polymerized.

4. The optical data storage medium of claim 1, wherein the replicated features on the first side comprise lands and grooves.

5. The optical data storage medium of claim 1, wherein the optical data storage medium comprises a read only memory (ROM) disk compatible with the DVD drive.

6. The optical data storage medium of claim 1, further comprising a print layer formed directly on the hard coat layer.

7. The optical data storage medium of claim 6, wherein the print layer comprises a printable layer or a printed layer.

8. The optical data storage medium of claim 1, further comprising a print layer formed over the hard coat layer.

9. The optical data storage medium of claim 1, further comprising a lacquer layer formed directly on the hard coat layer.

10. The optical data storage medium of claim 1, wherein the reflective layer defines a thickness between approximately 10 nanometers and 200 nanometers, and wherein the hard coat layer defines a thickness between approximately 1 micron and 10 microns.

11. The optical data storage medium of claim 1, wherein the reflective layer comprises silver, gold, aluminum, palladium or alloys containing silver, gold, aluminum or palladium.

12. The optical data storage medium of claim 1, wherein the hard coat layer comprises defines a thickness between approximately 0.1 micron and 20 microns.

13. The optical data storage medium of claim 1, wherein the hard coat layer defines a pencil hardness between approximately HB and 9H.

14. An optical data storage medium compatible with a digital versatile disk (DVD) drive, the medium comprising:
    a disk-shaped thermoplastic substrate defining a first side and a second side, wherein the first side includes replicated features and wherein the disk-shaped thermoplastic substrate defines a thickness over a substantial majority of the disk-shaped thermoplastic substrate of approximately 0.6 millimeters;
    an information layer formed directly on the first side of the disk-shaped thermoplastic substrate and the replicated features;
    a reflective layer formed directly on the information layer such that light from the DVD drive can pass through the disk-shaped thermoplastic substrate to the information layer and reflect off the reflective layer back to the DVD drive so that the DVD drive can read the information layer;
    a hard coat layer formed directly on the reflective layer, wherein the hard coat layer protects the replicated features and provides protection against oxidation of the reflective layer; and
    a print layer formed directly on the hard coat layer,
    wherein the information layer, the reflective layer, the hard coat layer and the print layer are sufficiently thin relative to the disk-shaped thermoplastic substrate such that the overall thickness of the optical data storage medium over a substantial majority of the optical data storage medium is approximately 0.6 millimeters.

15. An optical data storage medium compatible with a digital versatile disk (DVD) drive, the medium comprising:
    a disk-shaped thermoplastic substrate defining a first side and a second side, wherein the first side includes replicated features and wherein the disk-shaped thermoplastic substrate defines a thickness over a substantial majority of the disk-shaped thermoplastic substrate of approximately 0.6 millimeters;
    an information layer formed over directly on the first side of the disk-shaped thermoplastic substrate and the replicated features;
    a reflective layer formed directly on the information layer such that light from the DVD drive can pass through the disk-shaped thermoplastic substrate to the information layer and reflect off the reflective layer back to the DVD drive so that the DVD drive can read the information layer;
    a lacquer layer formed directly on the reflective layer, wherein the lacquer layer provides protection against oxidation of the reflective layer;
    a hard coat layer formed directly on the lacquer layer, wherein the hard coat layer protects the replicated features and; and
    a print layer formed directly on the hard coat layer,
    wherein the information layer, the reflective layer, the lacquer layer, the hard coat layer and the print layer are sufficiently thin relative to the disk-shaped thermoplastic substrate such that the overall thickness of the optical data storage medium over a substantial majority of the optical data storage medium is approximately 0.6 millimeters.

16. The optical data storage medium of claim 15, wherein the information layer comprises either a phase change stack or a dye, and wherein the optical data storage medium comprises a rewriteable (RW) medium or a recordable (R) medium.

* * * * *